United States Patent [19]
Faudie

[11] Patent Number: 5,456,436
[45] Date of Patent: Oct. 10, 1995

[54] THERMOS RETAINER FOR A VEHICLE

[76] Inventor: Daniel J. Faudie, 435 E. Scribner Ave., DuBois, Pa. 15801

[21] Appl. No.: 355,911

[22] Filed: Dec. 14, 1994

[51] Int. Cl.⁶ .................................................. A47K 1/08
[52] U.S. Cl. ..................... 248/311.2; 220/737; 224/275
[58] Field of Search ................ 248/311.2, 146, 248/683; 397/188.18; 224/42.42, 275, 42.45 R; 220/737

[56] References Cited

U.S. PATENT DOCUMENTS

| | | | |
|---|---|---|---|
| 2,843,302 | 7/1958 | Bandy | 220/737 |
| 4,339,061 | 7/1982 | Dunn | 297/188.18 X |
| 4,345,704 | 8/1982 | Boughton | 220/737 X |
| 4,874,109 | 10/1989 | Cook | 220/737 X |
| 4,957,254 | 9/1990 | Hill | 248/311.2 X |
| 5,007,612 | 4/1991 | Manfre | 248/311.2 X |
| 5,147,079 | 9/1992 | Heather | 220/737 X |
| 5,282,598 | 2/1994 | Greene | 224/42.42 |
| 5,356,107 | 10/1994 | Sinohuiz | 297/188.18 X |
| 5,390,887 | 2/1995 | Campbell | 248/146 X |

*Primary Examiner*—J. Franklin Foss

[57] ABSTRACT

A new and improved thermos retainer for a vehicle comprised of a generally rectangular container having a hollow base cylinder formed therein. The hollow base cylinder receives a thermos bottle therein. A handle pivotally couples with the rectangular container. A magnetic strip is secured to the rectangular container. The magnetic strip serves to secure the rectangular container to a steel surface.

4 Claims, 4 Drawing Sheets

5,456,436

THERMOS RETAINER FOR A VEHICLE

BACKGROUND OF THE INVENTION

1. Field of the Invention

The present invention relates to a thermos retainer for a vehicle and more particularly pertains to holding a thermos bottle securely and prevents it from rolling off a vehicle's seat or other surface on which it is placed with a thermos retainer for a vehicle.

2. Description of the Prior Art

The use of thermos bottle containers is known in the prior art. More specifically, thermos bottle containers heretofore devised and utilized for the purpose of retaining a thermos bottle are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 336,209 to Sambinelli discloses the ornamental design for a kettle.

U.S. Pat. No. 5,102,085 to Wieczorek discloses a vehicle interior accessory assembly for holding liquid containers and the like.

U.S. Pat. No. 5,054,733 to Shields discloses a container support device.

U.S. Pat. No. 4,427,123 to Komeda et al. discloses a stainless steel thermos bottle.

U.S. Pat. No. 4,150,806 to Dziuk discloses a vehicle retainer for thermos bottles.

While these devices fulfill their respective, particular objective and requirements, the aforementioned patents do not describe a thermos retainer for a vehicle for holding a thermos bottle securely and prevents it from rolling off a vehicles seat or other surface on which it is placed.

In this respect, the thermos retainer for a vehicle according to the present invention substantially departs from the conventional concepts and designs of the prior art, and in doing so provides an apparatus primarily developed for the purpose of holding a thermos bottle securely and prevents it from rolling off a vehicle's seat or other surface on which it is placed.

Therefore, it can be appreciated that there exists a continuing need for new and improved thermos retainer for a vehicle which can be used for holding a thermos bottle securely and prevents it from rolling off a vehicle's seat or other surface on which it is placed. In this regard, the present invention substantially fulfills this need.

SUMMARY OF THE INVENTION

In the view of the foregoing disadvantages inherent in the known types of thermos bottle containers now present in the prior art, the present invention provides an improved thermos retainer for a vehicle. As such, the general purpose of the present invention, which will be described subsequently in greater detail, is to provide a new and improved thermos retainer for a vehicle and method which has all the advantages of the prior art and none of the disadvantages.

To attain this, the present invention essentially comprises a generally rectangular container having an open top, a closed bottom, a front wall, a back wall, a first side wall, and a second side wall. The front wall has two securement portions secured thereto. The rectangular container has a hollow base cylinder formed therein that is accessible through the open top. The hollow base cylinder has a plurality of hook and loop materials therein. The hollow base cylinder receives a thermos bottle therein. The device contains a handle having two end portions. Each of the two end portions has a pivoting leg theresecured. Each pivoting leg pivotally coupled with the two securement portions of the rectangular container. A magnetic strip is secured to the back wall of the rectangular container. The magnetic strip covers almost half of the back wall. The magnetic strip serves to secure the rectangular container to a steel surface. A hook and loop strip is secured to the first side wall of the rectangular container. The hook and loop strip covers less than half of the first side wall. The hook and loop strip serves to retain the rectangular container to fabric surfaces. The device contains a thermos bottle. The thermos bottle is securable within the hollow base cylinder of the rectangular container.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved thermos retainer for a vehicle which has all the advantages of the prior art thermos bottle containers and none of the disadvantages.

It is another object of the present invention to provide a new and improved thermos retainer for a vehicle which may be easily and efficiently manufactured and marketed.

It is a further object of the present invention to provide a new and improved thermos retainer for a vehicle which is of durable and reliable construction.

An even further object of the present invention is to provide a new and improved thermos retainer for a vehicle which is susceptible of a low cost of manufacture with regard to both materials and labor, and which accordingly is then susceptible of low prices of sale to the consuming public, thereby making such a thermos retainer for a vehicle economically available to the buying public.

Still yet another object of the present invention is to provide a new and improved thermos retainer for a vehicle which provides in the apparatuses and methods of the prior art some of the advantages thereof, while simultaneously overcoming some of the disadvantages normally associated therewith.

Even still another object of the present invention is to provide a new and improved thermos retainer for a vehicle for holding a thermos bottle securely and prevents it from rolling off a vehicle's seat or other surface on which it is placed.

Lastly, it is an object of the present invention to provide a new and improved thermos retainer for a vehicle comprised of a generally rectangular container having a hollow base cylinder formed therein. The hollow base cylinder receives a thermos bottle therein. A handle pivotally couples with the rectangular container. A magnetic strip is secured to the rectangular container. The magnetic strip serves to secure the rectangular container to a steel surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
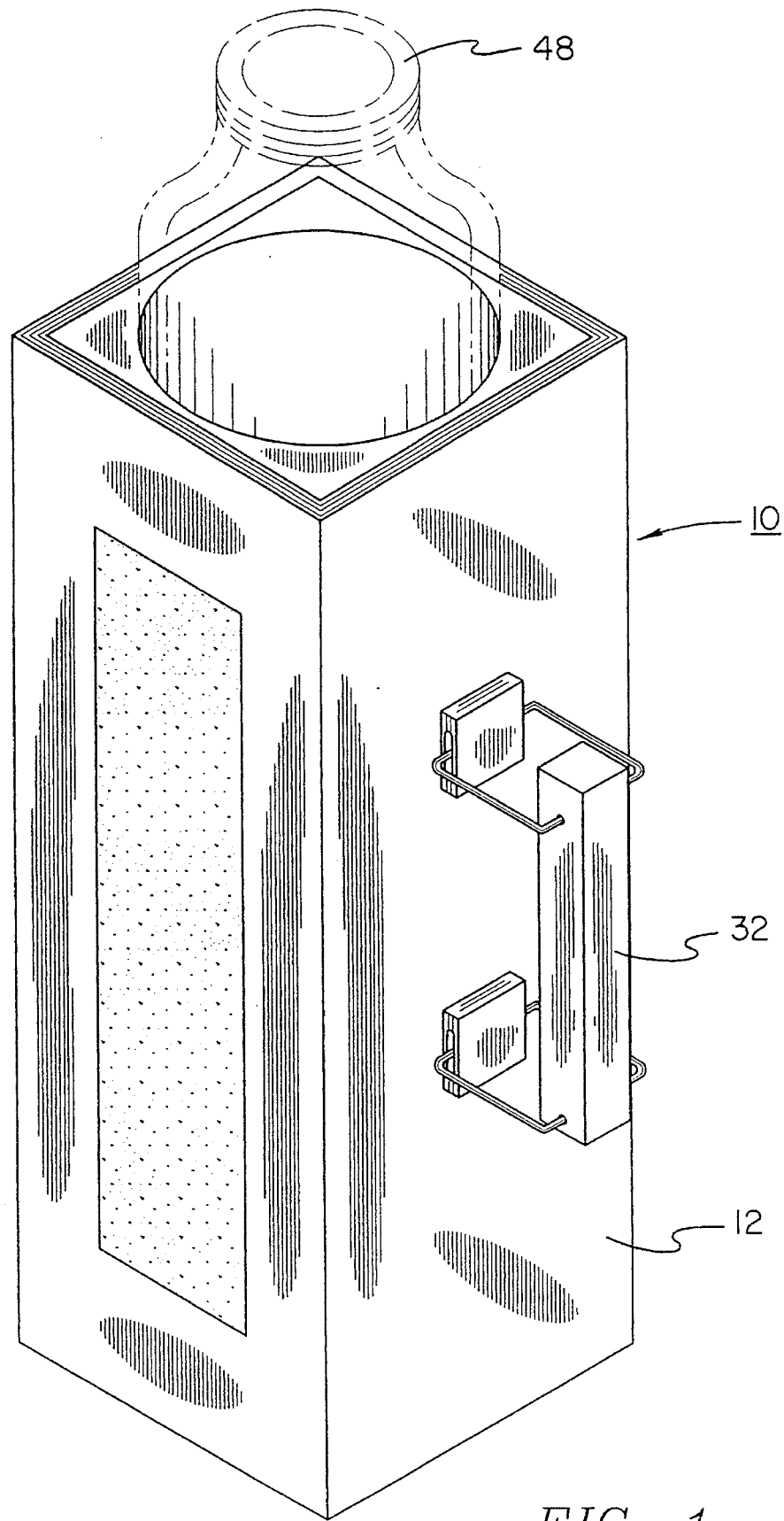
FIG. 1 is a perspective view of the preferred embodiment of the thermos retainer for a vehicle constructed in accordance with the principles of the present invention.
Figure 2:
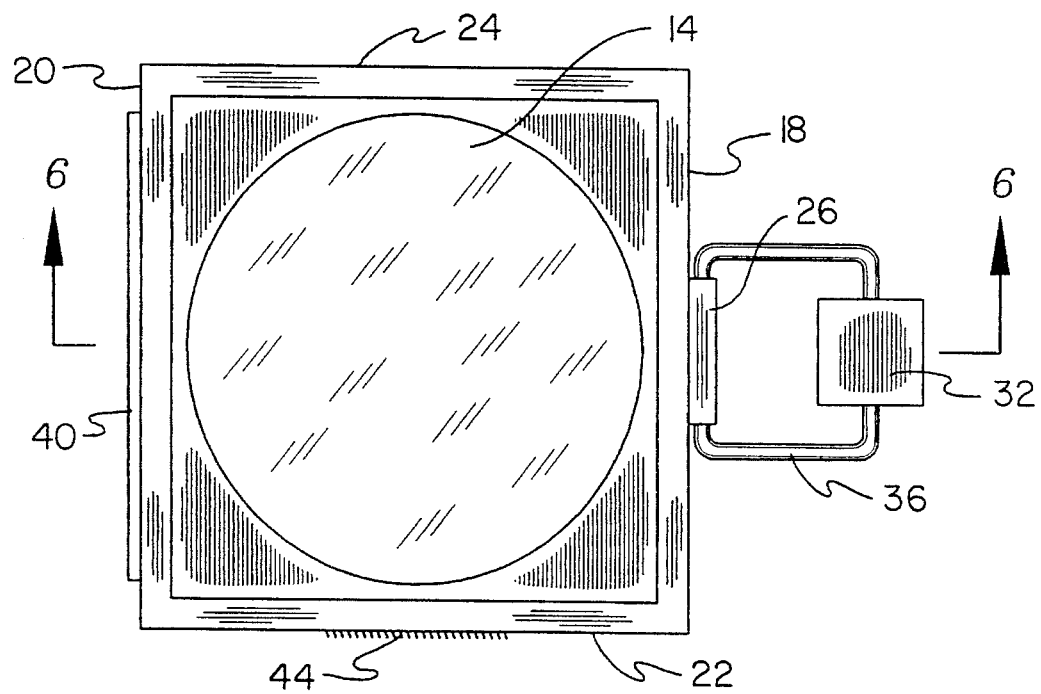
FIG. 2 is a plan view of the preferred embodiment of the present invention.
Figure 3:
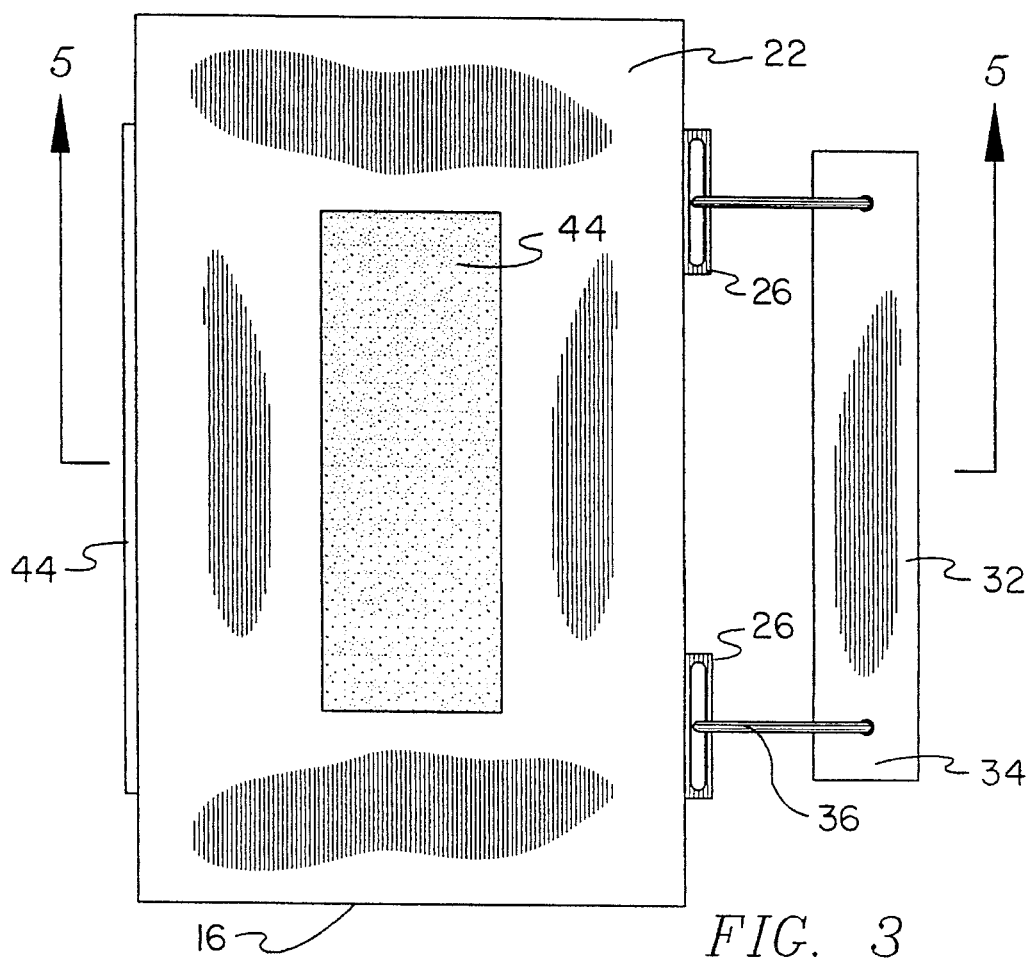
FIG. 3 is a side elevation view of the present invention.
Figure 4:
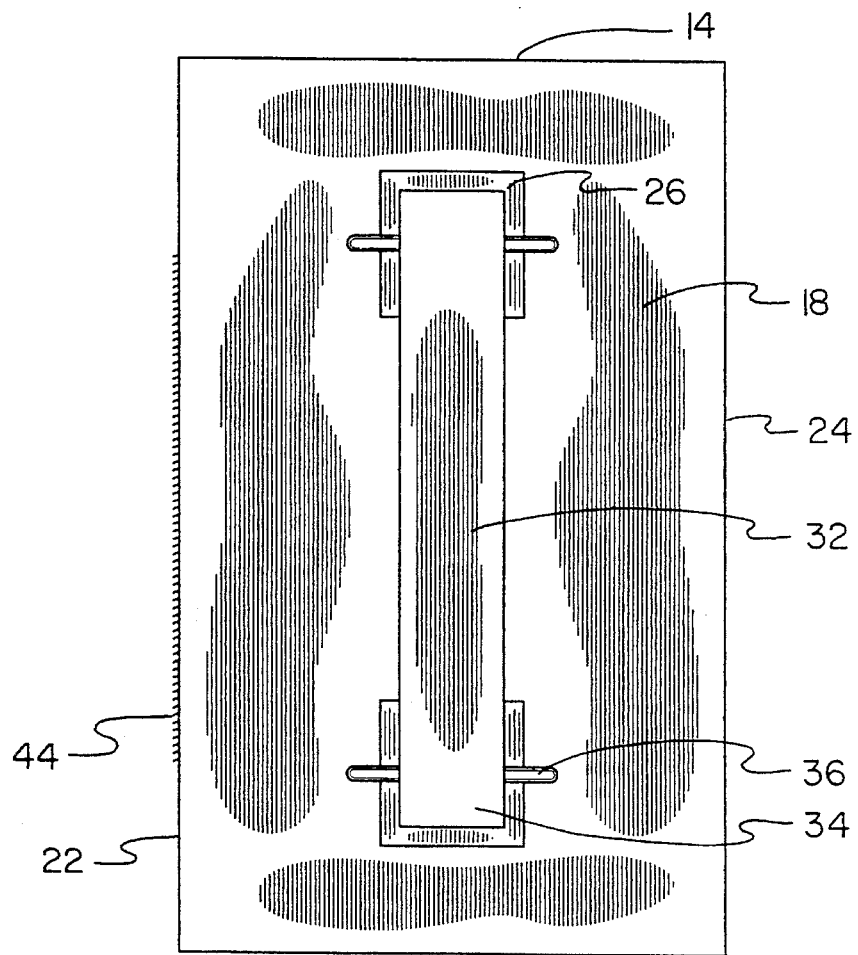
FIG. 4 is a front elevation view of the present invention.
Figure 5:
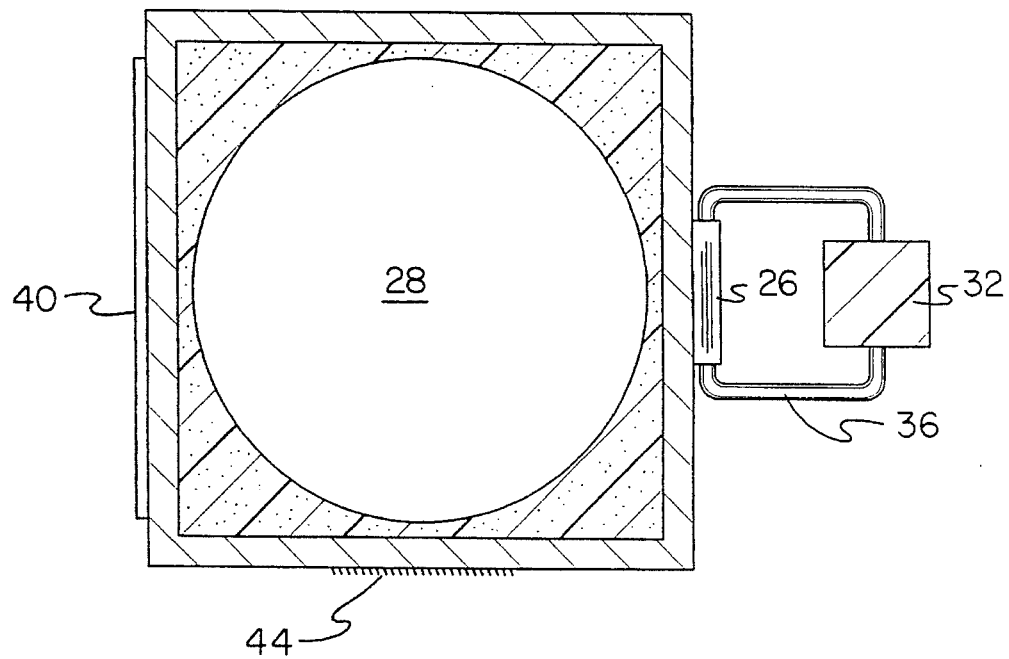
FIG. 5 is a cross-sectional view as taken along line 5—5 of FIG. 3.
Figure 6:
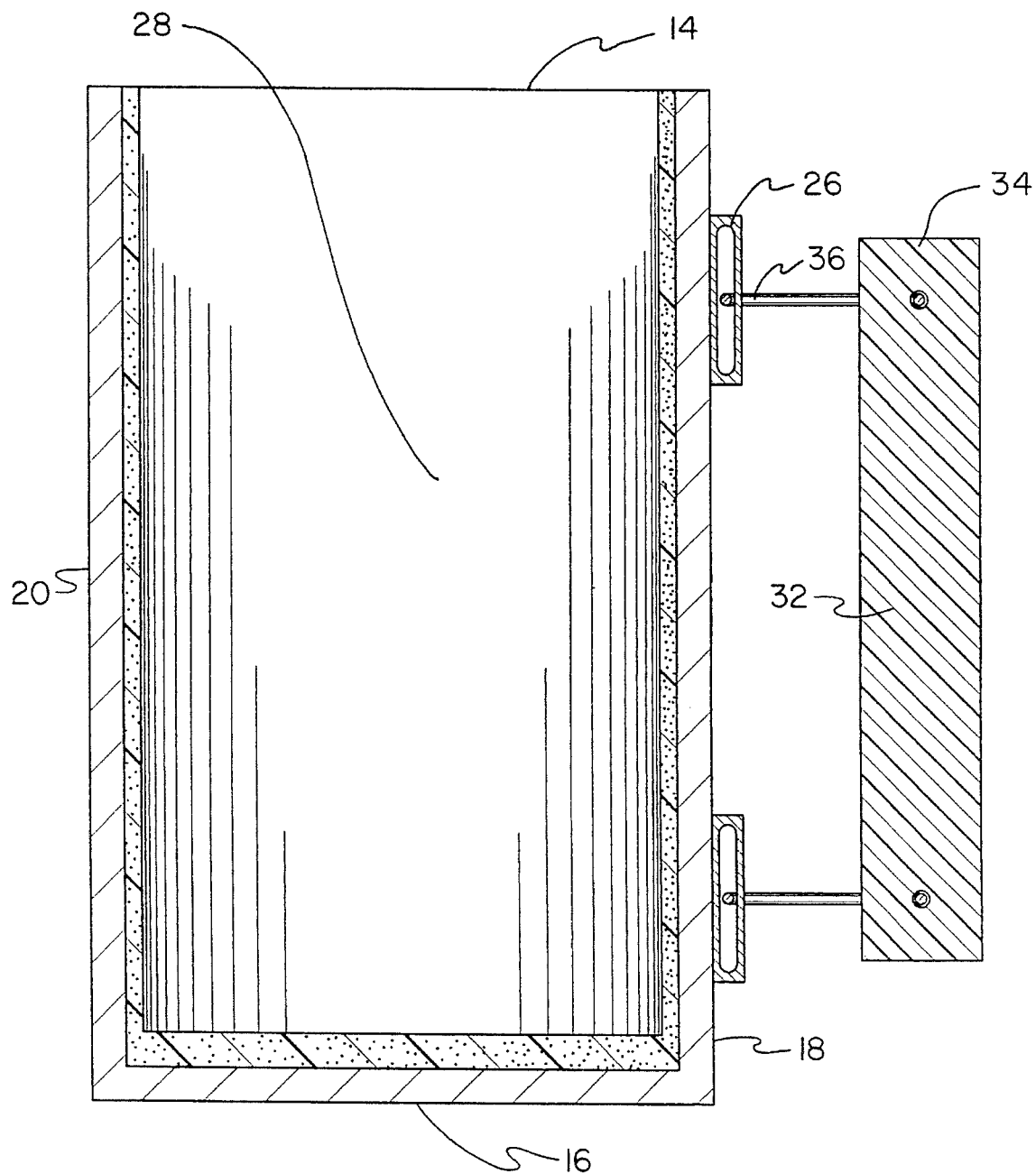
FIG. 6 is a cross-sectional view as taken along line 6—6 of FIG. 2.

With reference now to the drawings, and in particular, to FIG. 1 thereof, the preferred embodiment of the new and improved thermos retainer for a vehicle embodying the principles and concepts of the present invention and generally designated by the reference number 10 will be described.

Specifically, it will be noted in the various Figures that the device relates to a new and improved thermos retainer for a vehicle for holding a thermos bottle securely and prevents it from rolling off a vehicle's seat or other surface on which it is placed. In its broadest context, the device consists of a generally rectangular container, a handle, a magnetic strip, a hook and loop strip, and a thermos bottle.

The device 10 contains a generally rectangular container 12 having an open top 14, a closed bottom 16, a front wall 18, a back wall 20, a first side wall 22, and a second side wall 24. The front wall 18 has two securement portions 26 secured thereto. The rectangular container 12 has a hollow base cylinder 28 formed therein that is accessible through the open top 14. The hollow base cylinder 28 has a plurality of hook and loop materials therein. The hollow base cylinder 28 receives a thermos bottle therein. By containing a thermos bottle within the hollow base cylinder 28, the device 10 prevents the thermos bottle from rolling off of a seat within a vehicle. The size of the rectangular container 12 and the hollow base cylinder 28 can be varied to incorporate the use of different sized thermos bottles.

The device 10 contains a handle 32 having two end portions 34. Each of the two end portions 34 has a pivoting leg 36 theresecured. Each pivoting leg 36 pivotally coupled with the two securement portions 26 of the rectangular container 12. The handle allows for the user to easily transport the device 10.

A magnetic strip 40 is secured to the back wall 20 of the rectangular container 12. The magnetic strip 40 covers almost half of the back wall 20. The magnetic strip 40 serves to secure the rectangular container 12 to a steel surface. The size of the magnetic strip 40 allows the device 10 to be secured within a vehicle and to be resistant to vibrations caused by the vehicle.

A hook and loop strip 44 is secured to the first side wall 22 of the rectangular container 12. The hook and loop strip 44 covers less than half of the first side wall 22. The hook and loop strip 44 serves to retain the rectangular container 12 to fabric surfaces.

The device 10 contains a thermos bottle 48. The thermos bottle 48 is securable within the hollow base cylinder 28 of the rectangular container 12.

The present invention is a square holder for a thermos bottle which prevents it from rolling off a car seat or a tabletop.

It is a square tube with a closed bottom 16, is made of molded plastic or steel, and could be made in different sizes to fit different sized thermos bottles. The holder is just a little shorter than the thermos bottle. A handle 32 is fastened to one side and a magnetic strip 40 is secured to the opposite side. The magnetic strip 40 is used to secure the holder to a steel surface, and hook and loop material 44, positioned on an adjacent side, retains the holder on other materials. Hook and loop material also lines the inside of the holder to fasten the thermos in place. The holders could be made in various colors and patterns to please different users.

The thermos is placed in the holder and secured with the hook and loop material. The holder can be attached to any convenient surface, or placed on the seat of any vehicle, without the user worrying about it rolling off.

It holds a thermos bottle securely and prevents it from rolling off a vehicle's seat or other surface on which it is placed. Simply stated, a square container will not roll. The handle 32 allows it to be easily transported from the car to the job site.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved thermos retainer for a vehicle for holding a thermos bottle securely and prevents it from rolling off a vehicle's seat or other surface on which it is placed comprising, in combination:

a generally rectangular container having an open top, a closed bottom, a front wall, a back wall, a first side wall, and a second side wall, the front wall having two securement portions secured thereto, the rectangular container having a hollow base cylinder formed therein accessible through the open top, the hollow base cylinder having a plurality of hook and loop materials therein, the hollow base cylinder receiving a thermos bottle therein;

a handle having two end portions, each of the two end portions having a pivoting leg there secured each pivoting leg pivotally coupling with the two securement portions of the rectangular container;

a magnetic strip secured to the back wall of the rectangular container, the magnetic strip covering almost half of the back wall, the magnetic strip serving to secure the rectangular container to a steel surface;

a hook and loop strip secured to the first side wall of the rectangular container, the hook and loop strip covering less than half of the first side wall, the hook and loop strip serving to retain the rectangular container to fabric surfaces;

a thermos bottle, the thermos bottle securable within the hollow base cylinder of the rectangular container.

2. A new and improved thermos retainer for a vehicle for holding a thermos bottle securely and prevents it from rolling off a vehicle's seat or other surface on which it is placed comprising, in combination:

a generally rectangular container having a hollow base cylinder formed therein, the hollow base cylinder receiving a thermos bottle therein;

a handle pivotally coupling with the rectangular container;

a magnetic strip secured to the rectangular container, the magnetic strip serving to secure the rectangular container to a steel surface.

3. The retainer as described in claim 2 and further including wherein the hollow base cylinder having a plurality of hook and loop materials therein, the hook and loop materials serving to hold the thermos bottle in place.

4. The retainer as described in claim 3 and further including a hook and loop strip secured to the rectangular container adjacent the magnetic strip, the hook and loop strip serving to retain the rectangular container to fabric surfaces.

* * * * *